United States Patent
Uozumi (10) Patent No.: US 11,022,027 B2
(45) Date of Patent: Jun. 1, 2021

(54) INTERNAL COMBUSTION ENGINE WITH REDUCED ENGINE KNOCKING

(71) Applicant: HONDA MOTOR CO., LTD., Tokyo (JP)

(72) Inventor: Hisao Uozumi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 754 days.

(21) Appl. No.: 15/730,015

(22) Filed: Oct. 11, 2017

(65) Prior Publication Data
US 2018/0142608 A1 May 24, 2018

(30) Foreign Application Priority Data

Nov. 18, 2016 (JP) .............................. JP2016-225204
Jan. 11, 2017 (JP) .............................. JP2017-002276

(51) Int. Cl.
*F02B 29/04* (2006.01)
*F02F 3/12* (2006.01)
(Continued)

(52) U.S. Cl.
CPC .............. *F02B 29/045* (2013.01); *F01L 3/20* (2013.01); *F02F 1/18* (2013.01); *F02F 1/38* (2013.01);
(Continued)

(58) Field of Classification Search
CPC ... F02B 29/045; F02F 3/12; F02F 3/00; F02F 1/18; F02F 3/16; F02F 1/38; F02F 1/24;
(Continued)

(56) References Cited

U.S. PATENT DOCUMENTS

| 5,207,210 A | 5/1993 | Yamagata et al. |
| 2007/0113802 A1* | 5/2007 | Mihara ..................... F02F 3/12 123/41.35 |

(Continued)

FOREIGN PATENT DOCUMENTS

| CN | 105849381 A | 8/2016 |
| JP | S60134819 U | 9/1985 |

(Continued)

OTHER PUBLICATIONS

Office Action for CN Application No. 201711083949.2 and partial English translation, dated Oct. 28, 2019, 9 pages.
(Continued)

*Primary Examiner* — Joseph J Dallo
*Assistant Examiner* — Yi-Kai Wang
(74) *Attorney, Agent, or Firm* — Armstrong Teasdale LLP (57) ABSTRACT

In an internal combustion engine provided with a combustion chamber defined by an inner circumferential surface of a cylinder, an end surface of a cylinder head facing the cylinder, a crown surface of a piston, an inner surface of an intake valve, and an inner surface of an exhaust valve, for the purpose of improving the anti-knocking performance of the engine, the inner circumferential surface of the cylinder, the end surface of the cylinder head, the crown surface of the piston, the inner surface of the intake valve and the inner surface of the exhaust valve include a mirror surface region formed as a mirror surface having an arithmetic average roughness of 0.3 μm or less, and a rough surface region formed as a rough surface having an arithmetic average roughness of 0.3 μm or more.

10 Claims, 6 Drawing Sheets

(51) Int. Cl.
  *F01L 3/20*  (2006.01)
  *F02F 1/18*  (2006.01)
  *F02F 1/38*  (2006.01)
  *F02F 3/00*  (2006.01)
  *F02F 3/16*  (2006.01)
  *F02F 1/24*  (2006.01)

(52) U.S. Cl.
  CPC .............. *F02F 3/00* (2013.01); *F02F 3/12* (2013.01); *F02F 3/16* (2013.01); *F01L 2820/01* (2013.01); *F02F 1/24* (2013.01); *Y02T 10/12* (2013.01)

(58) Field of Classification Search
  CPC ....... F02F 1/00; F02F 1/36; F01L 3/20; F01L 2820/01; F01L 3/12; Y02T 10/12
  USPC ...................................................... 123/41.45
  See application file for complete search history.

(56) References Cited

U.S. PATENT DOCUMENTS

| | | | | |
|---|---|---|---|---|
| 2010/0236504 | A1* | 9/2010 | Yamazaki | F02P 5/153 123/41.72 |
| 2015/0204269 | A1* | 7/2015 | Hiratsuka | F01L 3/04 123/193.3 |
| 2016/0273484 | A1 | 9/2016 | Tateno et al. | |
| 2016/0319729 | A1 | 11/2016 | Sakai | |
| 2016/0348546 | A1* | 12/2016 | Kurahashi | F01L 3/12 |
| 2018/0038306 | A1* | 2/2018 | Ota | F01L 3/12 |

FOREIGN PATENT DOCUMENTS

| | | |
|---|---|---|
| JP | S61110836 U | 7/1986 |
| JP | H01125821 U | 8/1989 |
| JP | H01173417 U | 12/1989 |
| JP | H02123255 A | 5/1990 |
| JP | H0791311 A | 4/1995 |
| JP | 2002364455 A | 12/2002 |
| JP | 2010203334 A | 9/2010 |
| JP | 2012159059 A | 8/2012 |
| JP | 2014062490 A | 4/2014 |
| JP | 2015094292 A | 5/2015 |
| JP | 2016132993 A | 7/2016 |

OTHER PUBLICATIONS

JPO Notice of Reasons for Refusal for Japanese Patent Application No. 2017-00276 received Nov. 24, 2020; 4 pp.

* cited by examiner

INTERNAL COMBUSTION ENGINE WITH REDUCED ENGINE KNOCKING

TECHNICAL FIELD

The present invention relates to an internal combustion engine, and in particular to an internal combustion engine with reduced engine knocking.

BACKGROUND ART

In internal combustion engines, a high temperature of intake air (mixture) is known to be a primary cause of engine knocking. The intake air drawn into a combustion chamber is heated by the wall surface of the combustion chamber by convective heat transfer. Therefore, if the flow velocity of the intake air in the combustion chamber is increased, for instance, by creating a powerful tumble flow, the convective heat transfer is accelerated with the result that engine knocking is more likely to occur.

In order to reduce the convective heat transfer between the intake air and the wall surface of the combustion chamber, the wall surface of the combustion chamber may be formed as a mirror surface. It is known to form the wall surface of a combustion chamber as a mirror surface for the purpose of reducing the radiation heat transfer from the combustion gas to the wall of the combustion chamber, and thereby minimizing cooling loss. See JPH01-173417U and JPH02-123255A, for example.

In a combustion chamber of an internal combustion engine, the temperature of the intake air becomes higher than the temperature of the wall surface by being compressed in the compression stroke. Therefore, if the wall surface of the combustion chamber is formed as a mirror surface, convective heat transfer from the intake air to the wall surface of the combustion chamber is prevented so that the temperature of the intake air is increased, and engine knocking is more likely to occur.

SUMMARY OF THE INVENTION

In view of such a problem of the prior art, a primary object of the present invention is to improve anti-knocking performance of an internal combustion engine.

To achieve such an object, the present invention provides an internal combustion engine, comprising: a cylinder block (2) defining a cylinder (12); a cylinder head (3) attached to an upper end surface of the cylinder block; an intake port (35) formed in the cylinder head and provided with an intake valve (40) for selectively closing the intake port; an exhaust port (36) formed in the cylinder head and provided with an exhaust valve (41) for selective closing the exhaust port; and a piston (20) slidably received in the cylinder; a combustion chamber (44) being defined by an inner circumferential surface (11) of the cylinder, an end surface (30) of the cylinder head facing the cylinder, a crown surface (24) of the piston, an inner surface (47A) of the intake valve, and an inner surface (47A) of the exhaust valve; wherein at least one of the inner circumferential surface of the cylinder, the end surface of the cylinder head, the crown surface of the piston, the inner surface of the intake valve and the inner surface of the exhaust valve includes a mirror surface region formed as a mirror surface having an arithmetic average roughness of 0.3 μm or less, and a rough surface region formed as a rough surface having an arithmetic average roughness of 0.3 μm or more.

According to this arrangement, in the intake stroke of the internal combustion engine, convective heat transfer between the intake air and the mirror surface region of the wall structural components of the combustion chamber such as the inner circumferential surface of the cylinder, the end surface of the cylinder head, the crown surface of the piston, the inner surface of the intake valve and the inner surface of the exhaust valve is reduced so that the temperature rise of the intake air can be minimized. Meanwhile, in the compression stroke of the internal combustion engine, convective heat transfer between the intake air and the rough surface region of the wall structural components of the combustion chamber is promoted so that the intake air is cooled. On account of these facts, the temperature increase of the intake air is minimized, and the anti-knocking performance of the internal combustion engine can be improved.

In this invention, it may be arranged such that at least one of the valves includes a valve stem (46) and a head (47) provided at one end of the valve stem, and the head is provided with a head surface (47A) facing the combustion chamber, an annular face (47C) configured to be seated on a valve seat (38) formed in the cylinder head, and a peripheral surface (47D) located between the head surface and the annular face, the head surface being formed as the mirror surface region, the peripheral surface being formed as the rough surface region.

Thereby, in the intake stroke, convective heat transfer between the intake air and the head surface is promoted so that the temperature rise of the intake air is minimized. In the compression stroke, convective heat transfer between the intake air and the peripheral surface of the head of the valve is promoted so that the temperature rise of the intake air is minimized.

In this invention, the crown surface of the piston may include a central part (55) formed as the mirror surface region and an outer peripheral part (56) positioned around the central part and formed as the rough surface region.

According to this arrangement, in the intake stroke, convective heat transfer between the intake air and the central part of the crown surface is promoted so that the temperature rise of the intake air is minimized. In the compression stroke, convective heat transfer between the intake air and the outer peripheral part of the crown surface is promoted so that heat is favorably removed from the intake air. Because the intake air flows faster along the central part of the crown surface than along the outer periphery part of the crown surface in the intake stroke, convective heat transfer between the intake air and the central part can be accelerated by forming the central part as a mirror surface region, and the intake air is favorably cooled. Meanwhile, because the intake air flows faster along the outer periphery part of the crown surface than along the central part of the crown surface in the compression stroke, convective heat transfer between the intake air and the peripheral part can be accelerated by forming the peripheral part as the rough surface region, and the intake air is favorably cooled.

In this invention, the outer peripheral part of the crown surface of the piston may include a squish region.

The squish region causes the flow of the intake air along the crown surface outer peripheral part to be accelerated in the compression stroke so that convective heat transfer between the intake air and the crown surface outer peripheral part is promoted, and the intake air can be efficiently cooled.

In this invention, the engine may further comprise an oil jet device (28) configured to impinge an oil jet upon a part of a rear surface of the piston, the part where the oil jet is impinged upon corresponding to the outer peripheral part of the crown surface of the piston.

According to this arrangement, the crown surface outer peripheral part is cooled by the oil jet so that the intake air can be cooled in an even more favorable manner by convective heat transfer with the crown surface outer peripheral part.

In this invention, the end surface of the cylinder head may include a central part (51) which is formed as the mirror surface region, and an outer peripheral part (52) positioned around the central part and formed as the rough surface region.

According to this arrangement, convective heat transfer between the intake air and the combustion chamber end surface central part is reduced and the temperature rise of the intake air is minimized in the intake stroke, and convective heat transfer between the intake air and the combustion chamber end surface peripheral part is promoted, and heat is favorably removed from the intake air in the compression stroke. Because the intake air flowing along the combustion chamber end surface central part is higher in velocity than the intake air flowing along the combustion chamber end surface peripheral part in the intake stroke, convective heat transfer between the intake air and the combustion chamber end surface can be favorably limited by forming the combustion chamber end surface central part as a mirror surface region. In the compression stroke, because the intake air flows at a higher velocity along the combustion chamber end surface peripheral part than along the combustion chamber end surface central part, convective heat transfer between the intake air and the combustion chamber end surface can be promoted by forming the combustion chamber end surface peripheral part as a rough surface region, and the intake air can be cooled in an efficient manner.

In this invention, the outer peripheral part of the end surface of the cylinder head may include a squish region (31).

According to this arrangement, the intake flow along the combustion chamber end surface peripheral part is further accelerated by the squish region, convective heat transfer between the intake air and the combustion chamber end surface peripheral part formed as a rough surface region can be promoted, and the cooling air can be cooled even further.

In this invention, the internal combustion engine may further comprise a water jacket (37) formed in the cylinder head so as to adjoin the outer peripheral part of the end surface of the cylinder head.

By thus cooling the combustion chamber end surface peripheral part with the water jacket, the intake air can be cooled even further in the compression stroke by convective heat transfer to the combustion chamber end surface peripheral part.

In this invention, the outer peripheral part of the end surface may adjoin at least one of valve seats formed in the cylinder head from a side facing away from a central point of the end surface of the cylinder head.

According to this arrangement, the part of the combustion chamber end surface peripheral part along which the intake air flows at a high velocity is formed as the rough surface region, convective heat transfer between the intake air and the combustion chamber end surface peripheral part is promoted.

In this invention, the inner circumferential surface of the cylinder may include an exhaust side region adjoining the exhaust port and formed as the mirror surface region, and an intake side region adjoining the intake port and formed as the rough surface region.

According to this arrangement, convective heat transfer between the intake air and the exhaust side part of the cylinder is reduced in the intake stroke so that the temperature rise of the intake air can be minimized, and convective heat transfer between the intake air and the intake side part of the cylinder is promoted in the compression stroke so that the temperature rise of the intake air can be minimized. The intake air flow in the intake stroke is higher in speed along the exhaust side of the cylinder than along the intake side of the cylinder so that convective heat transfer between the intake air and the cylinder can be limited in an efficient manner by forming the exhaust side of the cylinder as the mirror surface region. Since the intake air flow in the compression stroke is faster along the intake side of the cylinder than along the exhaust side of the cylinder, convective heat transfer between the intake air and the intake side of the cylinder is promoted by forming the intake side of the cylinder as a rough surface region so that the intake air can be cooled in an efficient manner.

In this invention, it may be arranged such that a pair of intake ports are formed in the cylinder head, and the exhaust side region is provided with a width which is equal to or greater than an outer distance between the two intake ports, and smaller than an inner diameter of the cylinder.

According to this arrangement, convective heat transfer between the intake air introduced from the two intake ports into the cylinder in the intake stroke and the exhaust side of the cylinder is promoted so that the temperature rise of the intake air can be avoided.

According to such an arrangement, the anti-knocking performance of the internal combustion engine can be improved.

DETAILED DESCRIPTION OF THE PREFERRED EMBODIMENT(S)

An internal combustion engine according to an embodiment of the present invention is described in the following.

Figure 1:
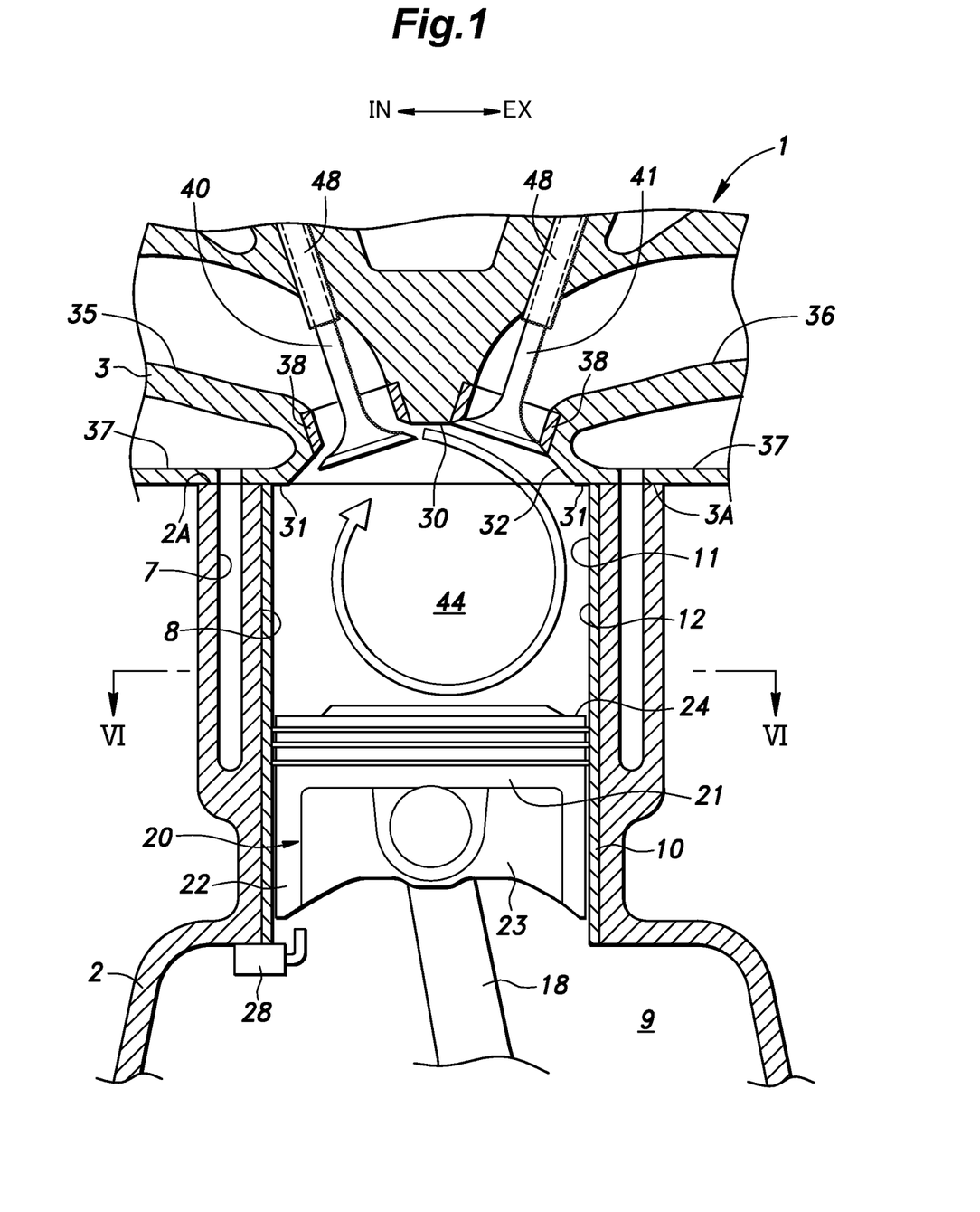
FIG. 1 is a sectional view of an internal combustion engine according to an embodiment of the present invention in the intake stroke.
Figure 2:
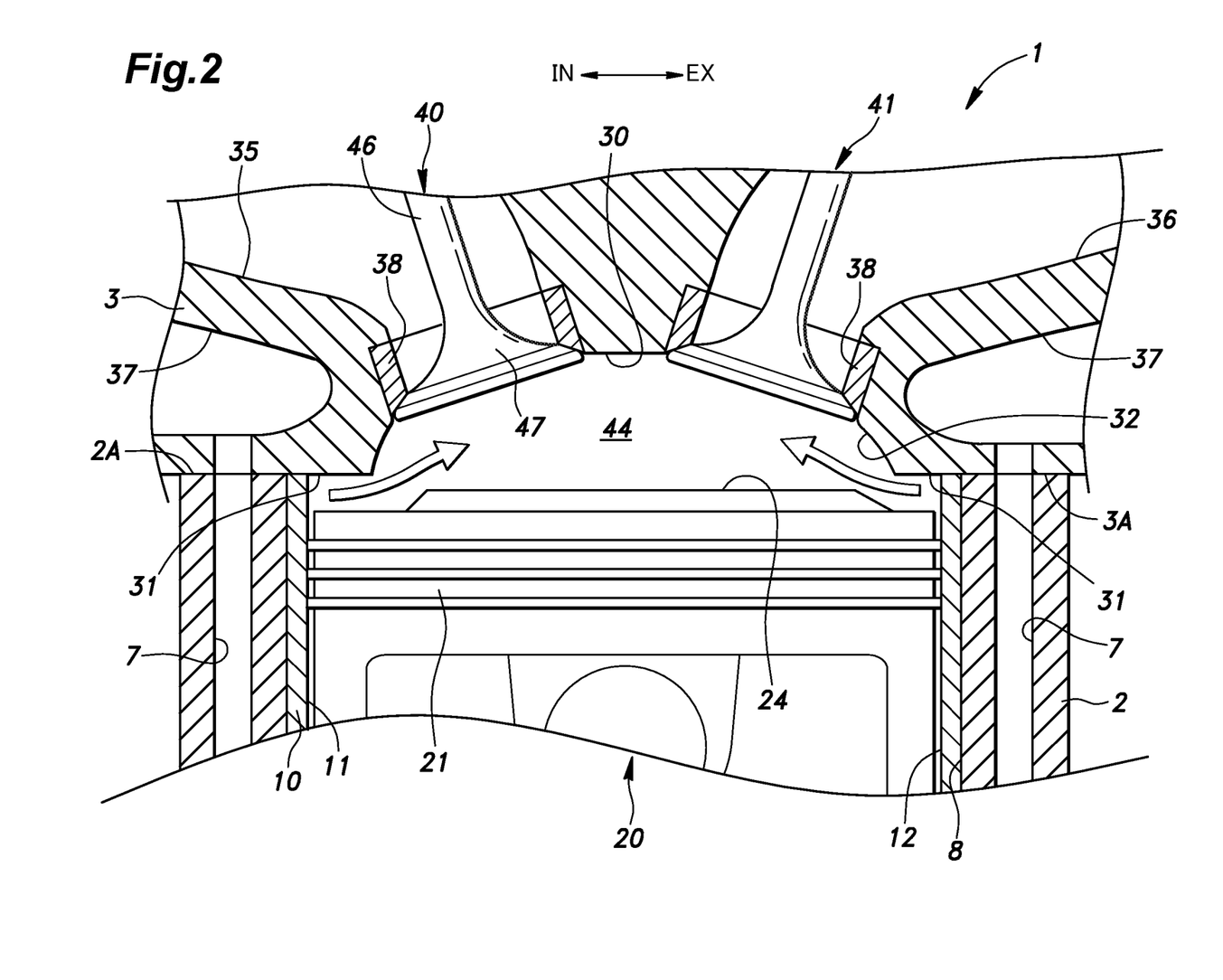
FIG. 2 is a sectional view of the internal combustion engine in the compression stroke.

As shown in FIGS. 1 and 2, an internal combustion engine 1 of a motor vehicle is provided with a cylinder block 2 and a cylinder head 3 attached to the upper end surface of the cylinder block 2. A cylinder bore 8 is internally formed in an upper part of the cylinder block 2. An upper end of the cylinder bore 8 opens out at an upper end surface 2A of the cylinder block 2, and a lower end thereof communicates with a crank chamber 9 formed in a lower part of the cylinder block 2. A cylindrical cylinder liner 10 having two open ends is press fitted into the cylinder bore 8. The inner circumferential surface 11 of the cylinder liner 10 defines a cylinder 12. The axis of the cylinder 12 is defined as a cylinder axis A.

A crankshaft (not shown in the drawings) is rotatably supported in the crank chamber 9 by bearings formed in a lower part of the cylinder block 2. The crankshaft is connected to a piston 20 slidably received in the cylinder 12 via a connecting rod 18. The lower end surface of the cylinder block 2 is closed by an oil pan (not shown in the drawings).

The piston 20 includes a disk-shaped crown 21 provided on the upper side thereof, and a pair of skirts 22 and a pair of bearing walls 23 extend downward from the outer periphery of the crown 21 in a circumferentially alternating manner so as to define an outer circumferential surface of the piston 20 in a continuous manner. The upper surface of the crown 21 is referred to as a piston crown surface 24.

An oil jet device 28 for ejecting oil toward the back surface of the crown 21 is provided in a wall part defining the crank chamber 9 of the cylinder block 2. The oil stored in the oil pan is supplied to the oil jet device 28 via an oil pump (not shown in the drawings).

The lower end surface 3A of the cylinder head 3 is attached to the upper end surface 2A of the cylinder block 2 so as to generally define a combustion chamber 44 in cooperation with the crown 21 of the piston 20, and has a combustion chamber end surface 30 which closes the upper end of the cylinder 12. The combustion chamber end surface 30 includes a combustion chamber recess 32 recessed upward in a central part thereof and a squish surface 31 extending along an outer peripheral part of the combustion chamber end surface 30. The squish surface 31 is formed on the same plane as the lower end surface 3A of the cylinder head 3, and opposes the piston 20. The cylinder head 3 is formed with two intake ports 35 and two exhaust ports 36 such that the inner ends of the two intake ports 35 and the inner ends of the two exhaust ports 36 open out to the combustion chamber recess 32. The two intake ports 35 extend from the combustion chamber recess 32 to one side surface of the cylinder head 3, and the two exhaust ports 36 extend from the combustion chamber recess 32 to the other side surface of the cylinder head 3. The side on which the intake ports 35 of the cylinder head 3 are disposed is referred to as "intake side," and the side on which the exhaust ports 36 are disposed is referred to as "exhaust side."

The cylinder head 3 internally defines a water jacket 37 formed along the periphery of the combustion chamber end surface 30. A part of the water jacket 37 is arranged adjacent to an outer peripheral portion 52 (see FIG. 4) of the combustion chamber end surface 30.

An annular valve seat 38 is formed around the open end of each of the intake ports 35 and the exhaust ports 36 in the combustion chamber recess 32. Each intake port 35 is provided with an intake valve 40 that opens and closes the intake port 35 by lifting from and seating on the corresponding valve seat 38. Each exhaust port 36 is provided with an exhaust valve 41 for opening and closing the exhaust port 36 by lifting from and seating on the corresponding valve seat 38. The intake valves 40 and the exhaust valves 41 are driven by a valve actuating mechanism (not shown in the drawings), and are opened and closed at a predetermined timing according to the angular position of the crankshaft.

Figure 3A:
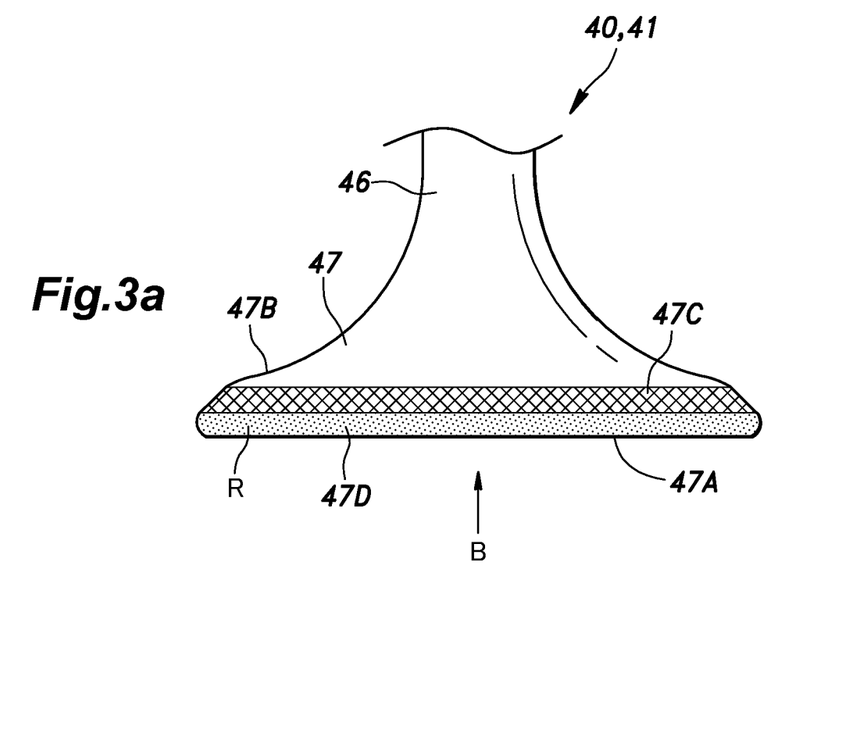
FIG. 3a is a side view of an engine valve.

As shown in FIG. 3a, each valve 40, 41 includes a valve stem 46 and a valve head 47. The valve head 47 is provided with a flat head surface 47A facing the combustion chamber 44 and a conical surface 47B facing away from the combustion chamber 44.

More precisely, the combustion chamber 44 is defined by the inner circumferential surface 11 of the cylinder liner 10, the combustion chamber end surface 30, the crown surface 24 of the piston 20, and the head surfaces 47A of the valves 40 and 41. The intake ports 35 are configured such that intake air that passes through the intake ports 35 flows into the combustion chamber 44 as a tumble flow.

A fuel injector (not shown in the drawings) for injecting fuel into the combustion chamber 44 may be provided in the combustion chamber recess 32.

(Intake Valves and Exhaust Valves)

Figure 3B:
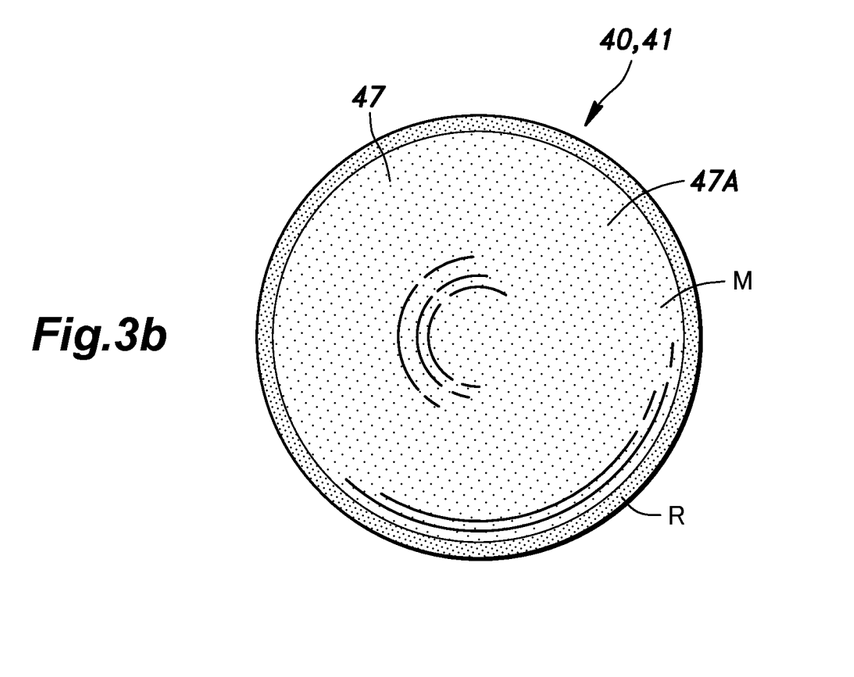
FIG. 3b is a bottom view of the engine valve.

As shown in FIGS. 3a and 3b, in each of the intake valves 40 and the exhaust valves 41, the lower end of the valve stem 46 is progressively enlarged in diameter toward the valve head 47 in a smooth and continuous manner. The valve stem 46 is axially slidably received in a cylindrical valve guide 48 (see FIG. 1) provided on the cylinder head 3. The valve head 47 is formed in a disk shape having a predetermined thickness. The conical surface 47B of the valve head 47 facing away from the combustion chamber 44 is formed with an annular valve face 47C which is configured to be snugly seated on the valve seat 38. The outer peripheral edge of the valve head 47 defines a peripheral surface 47D which smoothly and continuously connects the head surface 47A with the valve face 47C. The peripheral surface 47D is separated from the surface of the combustion chamber recess 32 via a gap when the valve face 47C is seated on the valve seat 38.

The head surface 47A is formed as a mirror surface (mirror surface region M). The mirror surface is defined as a surface having an arithmetic average roughness (Ra) of 0.3 µm or less. The mirror surface may also be defined as a surface having an arithmetic average roughness (Ra) of 0.1 µm or less. On the other hand, the peripheral surface 47D is formed as a rough surface (rough surface region R). The rough surface is defined as a surface having an arithmetic average roughness (Ra) of 0.3 µm or greater. In other words, the rough surface is a surface having a greater surface roughness (arithmetic average roughness) than the mirror surface. Forming a mirror surface and a rough surface can be carried out by known processing techniques, for example by shot blasting.

(Cylinder Head End Surface)

Figure 4:
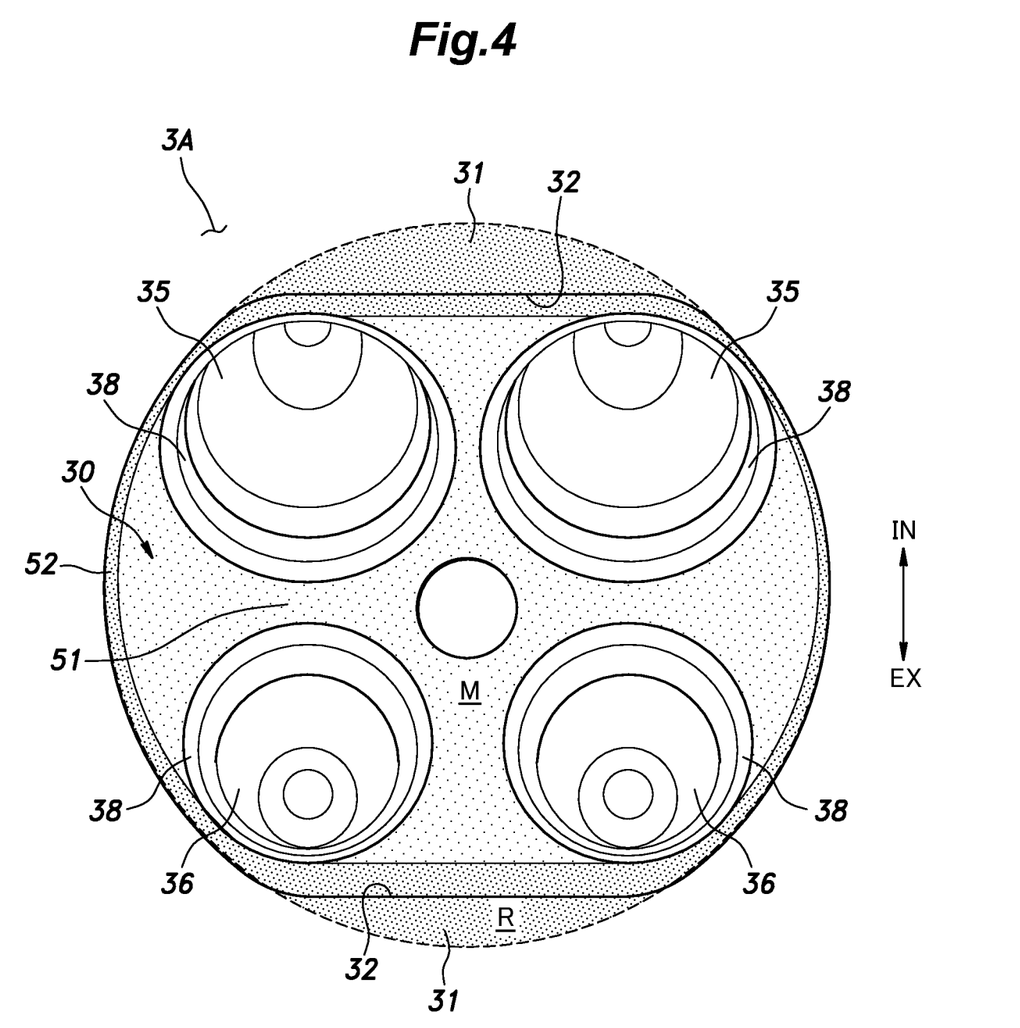
FIG. 4 is a bottom view of an end surface of a cylinder head.

As shown in FIG. 4, the combustion chamber end surface 30 includes an end surface central portion 51 including a central portion of the combustion chamber recess 32, and an end surface outer peripheral portion 52 including a peripheral portion of the combustion chamber recess 32 located on the outer periphery of the end surface central portion 51 and a squish surface 31. The squish surface 31 is formed on an intake side and an exhaust side in the shape of a circular segment. The part of the squish surface 31 on the intake side is defined by an arc section extending along the outer periphery of the end surface on the intake side and a chord section extending along the side parts of the two intake ports 35 remote from the center of the end surface. Similarly, the part of the squish surface 31 on the exhaust side is defined by an arc section extending along the outer periphery of the end surface on the exhaust side and a chord section extending along the side parts of the two exhaust ports 36 remote from the center of the end surface. In the illustrated embodiment, the part of the squish surface 31 on the intake side is larger than the part of the squish surface 31 on the exhaust side on account of the fact that the chord section on the exhaust side is spaced from the exhaust ports 36 by a larger distance than the chord section on the intake side is spaced from the intake ports 35. The end surface outer peripheral portion 52 is located along the outer periphery of the combustion chamber recess 32 and circumscribes the intake ports 35 and the exhaust ports 36. The end surface central portion 51 is formed as a mirror surface (mirror surface region M), and the end surface outer peripheral portion 52 (including the squish surface 31) is formed as a rough surface (rough surface region R).

(Piston)

Figure 5A:
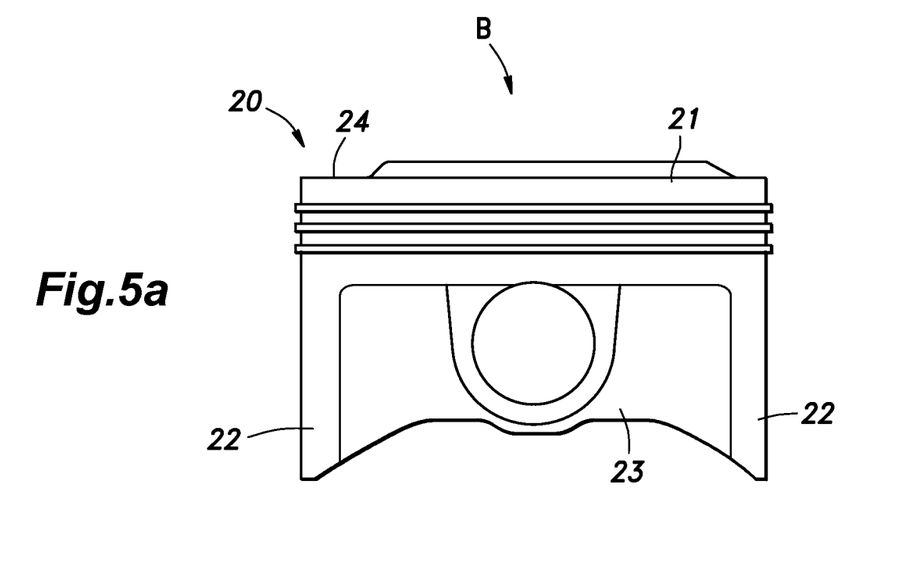
FIG. 5a is a side view of a piston.
Figure 5B:
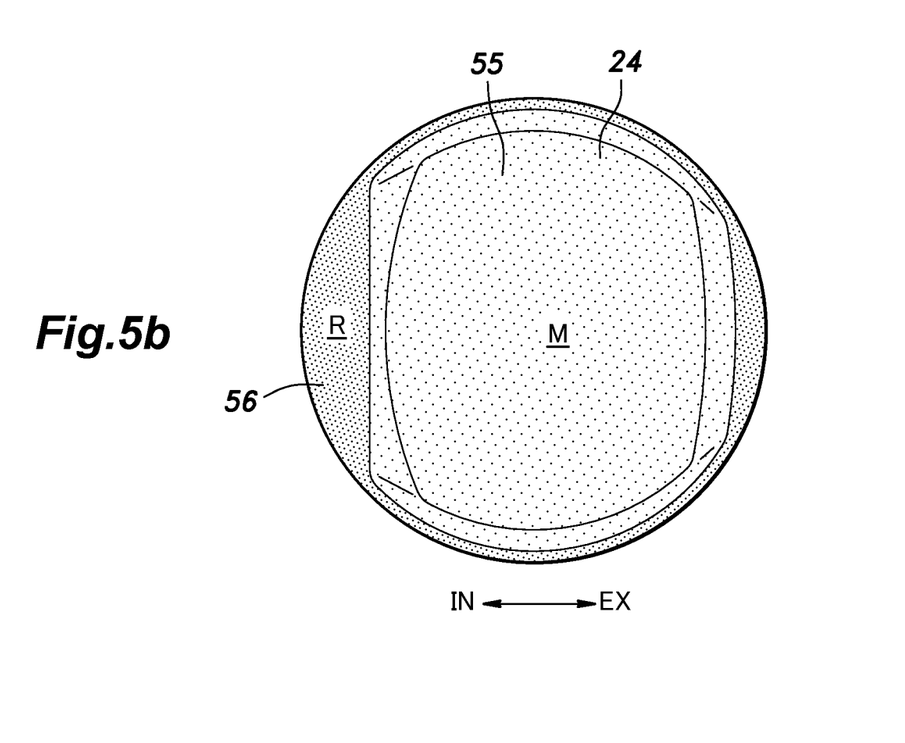
FIG. 5b is a plan view of the piston.

As shown in FIG. 5b, the piston crown surface 24 includes a crown center portion 55 located in the center thereof and an annular crown surface outer peripheral portion 56 located on the outer periphery of the crown center portion 55. The crown surface outer peripheral portion 56 is provided with a part facing the squish surface 31 on the intake side and a part facing the squish surface 31 on the exhaust side. The crown center portion 55 is formed as a mirror surface (mirror surface region M), and the crown surface outer peripheral portion 56 is formed as a rough surface (rough surface region R).

(Cylinder Liner)

Figure 6:
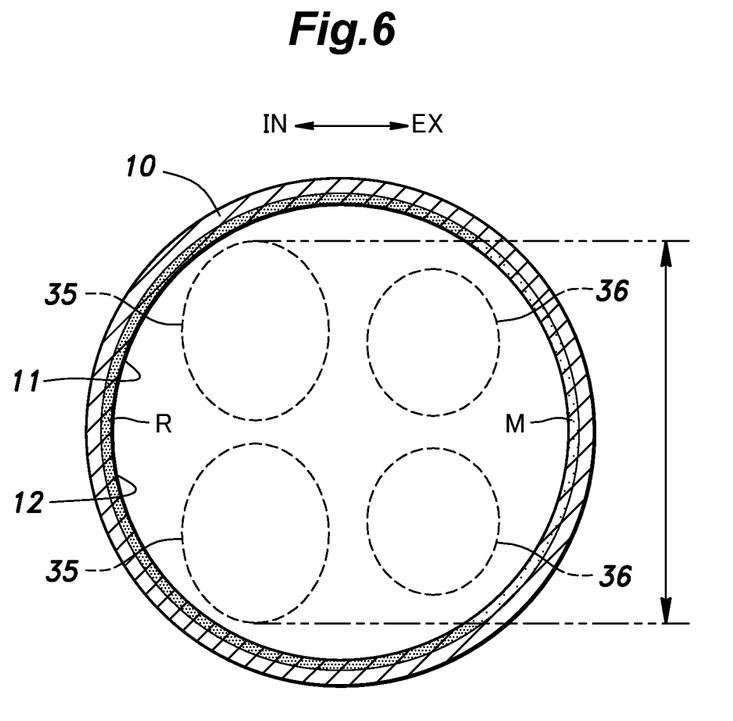
FIG. 6 is a sectional view taken along line VI-VI of FIG. 1.

As shown in FIG. 6, an exhaust side part of the inner circumferential surface 11 of the cylinder liner 10 is formed as a mirror surface (mirror surface region M), and an intake side part of the inner circumferential surface 11 of the cylinder liner 10 is formed as a rough surface (rough surface region R). The mirror surface region M of the cylinder liner 10 has a width equal to or greater than the distance between the outer ends of the two intake ports 35 as measured in the crankshaft axial direction (outer distance) but smaller than the inner diameter of the cylinder 12. In the present embodiment, the width of the mirror surface region M of the cylinder liner 10 in the crankshaft axial direction is equal to the distance between the outer ends of the two intake ports 35. The rough surface region R of the cylinder liner 10 may include the entire part of the inner circumferential surface of the cylinder liner 10 excluding the mirror surface region M of the cylinder liner 10. The rough surface region R may extend by more than one half of the entire inner circumference of the cylinder liner 10 or, in other words, extend from the intake side beyond a middle point.

The rough surface region R of the inner circumferential surface 11 of the cylinder liner 10 is not necessarily provided in the entire area of the inner circumferential surface 11 along the cylinder axis direction, but only on the side of the cylinder head 3. For instance, the rough surface region R may extend from the cylinder head 3 side of the inner circumferential surface 11 only in the range of ½ or less of the stroke of the piston 20, or ¼ or less of the stroke of the piston 20, while the remaining part is formed as the mirror surface region M.

The mode of operation and advantages of the internal combustion engine 1 described above are discussed in the following. In the intake stroke of the internal combustion engine 1, the intake valves 40 open and the piston 20 descends, and the intake air flows into the combustion chamber 44 from the intake ports 35. The intake air here may consist either solely of air or a mixture containing fuel. The intake air flows through the gaps between the intake valves 40 and the valve seats 38 of the respective intake ports 35 in the radial direction. At this time, a primary part of the intake air flows into the combustion chamber 44 from the part of the gaps corresponding to the exhaust side ends of the valve heads 47 of the intake valves 40 toward the exhaust side with a downward slant, and passes along the combustion chamber recess 32, the head surfaces 47A of the exhaust valves 41, the exhaust side part of the inner circumferential surface 11 of the cylinder liner 10 in that order. Thereafter, the intake air flow forms a tumble flow by being directed toward the intake side with an upward slant, and passes along the crown center portion 55 of the piston 20, the intake side part of the inner circumferential surface 11 of the cylinder liner 10, the combustion chamber recess 32, and the head surfaces 47A of the intake valves 40 in that order. The velocity of the intake air attains a maximum value as the intake air flows into the combustion chamber 44 via the intake ports 35. Therefore, the intake air flows along the combustion chamber recess 32, the head surfaces 47A of the exhaust valves 41 and the exhaust side part of the inner circumferential surface 11 of the cylinder liner 10 at relatively higher velocities than along other parts of the combustion chamber wall.

In the compression stroke, as the piston 20 ascends, the intake air compressed between the crown surface outer peripheral portion 56 of the piston 20 and the end surface outer peripheral portion 52 including the squish surface 31 flows toward the center of the combustion chamber 44. Therefore, in the compression stroke, the intake air attains a higher velocity along the end surface outer peripheral portion 52 including the crown surface outer peripheral portion 56 and the squish surface 31 of the piston 20 than along other parts of the combustion chamber wall. Further, in the compression stroke, the compressed intake air flows into the gap between the peripheral surface 47D of each valve head 47 and the adjoining part of the combustion chamber recess 32, and therefore, the velocity of the intake air around the peripheral surface 47D is higher than other parts of the combustion chamber wall.

In this internal combustion engine 1, in the intake stroke, because the combustion chamber recess 32, the head surfaces 47A of the valves 40 and 41, the exhaust side part of the cylinder liner 10, and the crown center portion 55 at which the flow velocity of the intake air becomes higher than at other parts of the combustion chamber wall are formed as the mirror surface region M, convective heat transfer between the intake air and the combustion chamber recess 32 of the combustion chamber, the head surfaces 47A of the valves 40 and 41, the exhaust side part of the cylinder liner 10, and the crown center portion 55 of the piston 20 is reduced. As a result, the temperature rise of the intake air is reduced. In the intake stroke, since the temperature of the wall surface defining the combustion chamber 44 is higher than that of the intake air, it is desirable to minimize convective heat transfer in order to reduce the temperature rise of the intake air. Convective heat transfer becomes more active as the flow velocity increases owing to the increased disturbance in the temperature boundary layer. Therefore, in a region where the flow velocity of the intake air is high, the intake air receives a large amount of heat from the wall surface defining the combustion chamber 44.

In the present embodiment, the combustion chamber recess 32, the head surfaces 47A of the valves 40 and 41, the exhaust side portion of the cylinder liner 10, and the crown center portion 55 at which the flow velocity of the intake air becomes higher than at other parts of the combustion chamber 44 in the intake stroke are formed as the mirror surface region M so that the disturbance of the temperature boundary layer is reduced, and the heat transfer coefficients in these regions are lowered. As a result, the amount of heat received by the intake air from the wall surface defining the combustion chamber 44 decreases, and the temperature rise of the intake air is reduced.

On the other hand, in the compression stroke, since the compressed intake air is higher in temperature than the wall surface defining the combustion chamber 44, it is desirable to cool the intake air by promoting heat exchange between the intake air and the wall surface defining the combustion chamber 44. In this embodiment, the crown surface outer peripheral portion 56 of the piston 20, the end surface outer peripheral portion 52 including the squish surface 31, and the peripheral surfaces 47D of the valves 40 and 41 at which the flow velocity of the intake air becomes higher than at other parts of the combustion chamber 44 in the compression stroke are formed as the rough surface region R so that the disturbance of the temperature boundary layer is increased, and the heat transfer coefficients in these regions are increased. Also, since the crown surface outer peripheral portion 56 of the piston 20, the end surface outer peripheral portion 52 including the squish surface 31, and the peripheral surfaces 47D of the valves 40 and 41 are formed as the rough surface region R, the surface areas of these regions are increased, and the heat transfer in these regions is promoted. As a result, the amount of heat transferred from the intake air to the wall surface defining the combustion chamber 44 increases, and the temperature rise of the intake air is minimized. Furthermore, since the region of the inner circumferential surface 11 of the cylinder liner 10 on the intake side is formed as the rough surface region R, heat transfer from the intake air to the cylinder liner 10 is promoted.

It was confirmed that the ignition timing can be advanced further toward MBT (maximum brake torque) without causing engine knocking by forming the end surface central portion 51 as the mirror surface region M and the end surface outer peripheral portion 52 including the squish surface 31 as the rough surface region R than by forming both the end surface outer peripheral portion 52 and the end surface central portion 51 as the rough surface region R.

It was also confirmed that the ignition timing can be advanced further toward MBT without causing engine knocking by forming the exhaust side of the inner circumferential surface of the cylinder liner 10 as the mirror surface region M while the remaining part of the cylinder liner 10 including the intake side thereof is formed as the rough surface region R than by forming the entire inner circumferential surface of the cylinder liner 10 including both the intake side and the exhaust side thereof as the rough surface region R.

It was also confirmed that the ignition timing can be advanced further toward MBT without causing engine knocking by forming the crown center portion 55 of the piston 20 as the mirror surface region M and the crown surface outer peripheral portion 56 as the rough surface region R than by forming both the crown center portion 55 and the crown surface outer peripheral portion 56 as the rough surface region R.

Further, it was confirmed that the ignition timing can be advanced further toward MBT by one degree without causing engine knocking by forming the head surfaces 47A of the valves 40 and 41 as the mirror surface region M and the peripheral surfaces 47D as the rough surface region R than by forming both the head surfaces 47A and the peripheral surfaces 47D as the rough surface region R. These tests were conducted at WOT and the engine rotational speed of 2,500 rpm.

Although the present invention has been described in terms of a preferred embodiment thereof, it is obvious to a person skilled in the art that various alterations and modifications are possible without departing from the scope of the present invention. For instance, in the above embodiment, the inner circumferential surface 11 of the cylinder liner 10 defined the inner circumferential surface of the cylinder 12, but the cylinder liner 10 may be omitted and the inner circumferential surface of the cylinder bore 8 may directly define the inner circumferential surface 11.

The invention claimed is:

1. An internal combustion engine, comprising: a cylinder block defining a cylinder; a cylinder head attached to an upper end surface of the cylinder block; an intake port formed in the cylinder head and provided with an intake valve for selectively closing the intake port; an exhaust port formed in the cylinder head and provided with an exhaust valve for selective closing the exhaust port; and a piston slidably received in the cylinder; a combustion chamber being defined by an inner circumferential surface of the cylinder, an end surface of the cylinder head facing the cylinder, a crown surface of the piston, an inner surface of the intake valve, and an inner surface of the exhaust valve;
   wherein at least one of the inner circumferential surface of the cylinder, the end surface of the cylinder head, the crown surface of the piston, the inner surface of the intake valve and the inner surface of the exhaust valve includes a mirror surface region formed as a mirror surface having an arithmetic average roughness of 0.3 µm or less, and a rough surface region formed as a rough surface having an arithmetic average roughness of 0.3 µm or more,
   wherein the mirror surface region is placed in a part where the flow velocity of an intake air becomes higher than at other parts of the combustion chamber in the intake stroke,
   wherein the rough surface region is placed in a part where the flow velocity of the intake air becomes higher than at other parts of the combustion chamber in the compression stroke, and
   wherein at least one of the valves includes a valve stem and a head provided at one end of the valve stem, and the head is provided with a head surface facing the combustion chamber, an annular face configured to be seated on a valve seat formed in the cylinder head, and a peripheral surface located between the head surface and the annular face, the head surface being formed as the mirror surface region, the peripheral surface being formed as the rough surface region.

2. The internal combustion engine according to claim 1, wherein the crown surface of the piston includes a central part formed as the mirror surface region and an outer peripheral part positioned around the central part and formed as the rough surface region.

3. The internal combustion engine according to claim 2, wherein the outer peripheral part of the crown surface of the piston includes a squish region.

4. The internal combustion engine according to claim 2, further comprising an oil jet configured to impinge an oil jet device upon a part of a rear surface of the piston, the part where the oil jet is impinged upon corresponding to the outer peripheral part of the crown surface of the piston.

5. The internal combustion engine according to claim 1, wherein the end surface of the cylinder head includes a central part which is formed as the mirror surface region, and an outer peripheral part positioned around the central part and formed as the rough surface region.

6. The internal combustion engine according to claim 5, wherein the outer peripheral part of the end surface of the cylinder head includes a squish region.

7. The internal combustion engine according to claim 5, further comprising a water jacket formed in the cylinder head so as to adjoin the outer peripheral part of the end surface of the cylinder head.

8. The internal combustion engine according to claim 5, wherein the outer peripheral part of the end surface adjoins at least one of valve seats formed in the cylinder head from a side facing away from a central point of the end surface of the cylinder head.

9. The internal combustion engine according to claim 1, wherein the inner circumferential surface of the cylinder includes an exhaust side region adjoining the exhaust port and formed as the mirror surface region, and an intake side region adjoining the intake port and formed as the rough surface region.

10. The internal combustion engine according to claim 9, wherein a pair of intake ports are formed in the cylinder head, and the exhaust side region is provided with a width which is equal to or greater than an outer distance between the two intake ports, and smaller than an inner diameter of the cylinder.

\* \* \* \* \*